United States Patent
Heselhaus et al.

(10) Patent No.: US 6,454,342 B2
(45) Date of Patent: Sep. 24, 2002

(54) CONVERTIBLE VEHICLE

(75) Inventors: Udo Heselhaus, Ibbenbueren; Karl Rothe, Rieste; Klaus Russke, Bissendorf; Werner Schnieder, Georgsmarienhuette, all of (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/879,285

(22) Filed: Jun. 12, 2001

(30) Foreign Application Priority Data

Jun. 15, 2000 (DE) ......................... 100 29 473

(51) Int. Cl.⁷ ................................. B60J 7/00
(52) U.S. Cl. ..................... 296/107.07; 296/146.14; 296/107.01
(58) Field of Search .................. 296/107.07, 146.14, 296/128, 107.09, 107.01

(56) References Cited

U.S. PATENT DOCUMENTS

| | | | | |
|---|---|---|---|---|
| 2,833,593 A | * | 5/1958 | Olivier et al. | 296/107.07 |
| 3,236,557 A | * | 2/1966 | Podolan | 296/107.07 |
| 3,332,169 A | * | 7/1967 | Lohr et al. | 296/146.14 |
| 3,333,362 A | * | 8/1967 | Kostin et al. | 296/146.14 |
| 3,346,297 A | * | 10/1967 | Colautti et al. | 296/146.14 |
| 4,693,509 A | * | 9/1987 | Moy et al. | 296/107.07 |
| 4,778,215 A | * | 10/1988 | Ramaciotti | 296/107.07 |
| 4,784,428 A | * | 11/1988 | Moy et al. | 296/107.07 |
| 4,799,727 A | * | 1/1989 | Robbins et al. | 296/107.07 |
| 5,246,262 A | * | 9/1993 | Schrader et al. | 296/146.14 |
| 5,375,901 A | * | 12/1994 | Agosta et al. | 296/146.14 |
| 6,039,382 A | * | 3/2000 | Mather et al. | 296/107.01 |
| 6,095,589 A | * | 8/2000 | Kinnanen et al. | 296/107.09 |

FOREIGN PATENT DOCUMENTS

| | | | |
|---|---|---|---|
| DE | 3416330 A1 | * | 11/1985 |
| DE | 3726430 C1 | * | 9/1988 |
| DE | 3808910 A1 | * | 10/1989 |
| EP | 0426201 A1 | * | 3/1987 |
| JP | 61 222817 | * | 10/1986 |
| JP | 4 11516 | * | 1/1992 |

* cited by examiner

*Primary Examiner*—Kiran Patel
(74) *Attorney, Agent, or Firm*—Jordan and Hamburg LLP

(57) ABSTRACT

A convertible vehicle has a folding top frame (3) with a rear folding top clamping collar (4; 4'; 4"), which is constructed in mirror image fashion to the longitudinal median plane (2) of the vehicle. By being shifted about a main bearing (5) attached to the car body, a folding top (7) can be stowed in or returned from a rear folding top compartment (8). The flexible roof skin (6) has in the rear region particularly a dimensionally stable rear window (9) with an essentially rectangular circumferential contour, which extends above the folding top clamping collar (4; 4'; 4"). Only in the region of the upper transverse side edge (10) as well as of its two longitudinal side edges (11, 12) is the dimensionally stable rear window (9) provided with a connection taking hold of the flexible roof skin (6). A lower transverse side edge (13) of the rear window (9) is supported in the closed position of the folding top (7) directly from above on the folding top clamping collar (4; 4') in a detachable connecting engagement.

25 Claims, 6 Drawing Sheets

CONVERTIBLE VEHICLE

BACKGROUND OF THE INVENTION

Figure 1:
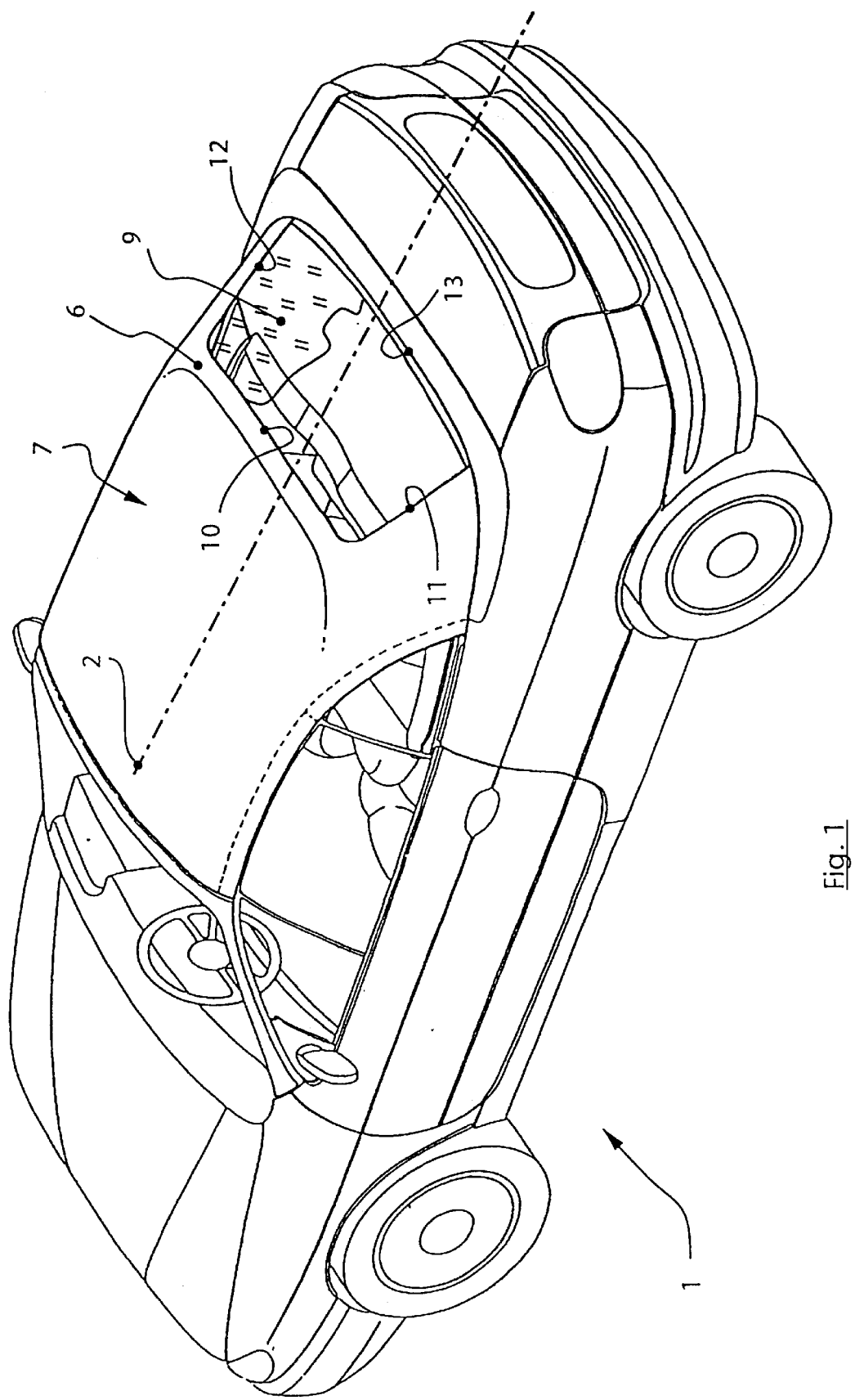

The invention relates to a convertible vehicle with a folding top having a rear clamping collar.

In the case of a known convertible vehicle of this type (DE 41 28 115 C1), the folding top has a folding-top cloth, which borders the rear window and, in the region above the folding top clamping collar, extends in a broad fabric strip to the rear window, so that the latter, due to the small dimensions, offers a limited field of vision and has a negative effect on the safety of the users of the vehicle. In the case of a folding top of DE 43 09 607 A1, the adjustable rear window is supported with its lower edge region from inside against the folding top clamping collar, so that an external sealing joint, which tends to become soiled and requires disadvantageously high contacting forces and an expensive control system for the components, is formed in a narrow contacting region.

SUMMARY OF THE INVENTION

The invention is concerned with the problem of creating for a convertible vehicle a rear window, which is integrated in the skin of the roof with little technical effort in such a manner that, in the region of the folding top clamping collar, an enlarged window area makes possible an improved rear vision and a reliable leakproofness.

Pursuant to the invention, this objective is accomplished with a rear window for a convertible vehicle with the distinguishing features of claim 1. With regard to significant further developments of the inventive convertible vehicle, reference is made to claims 2 to 14.

In the case of the inventive convertible vehicle, the rear window has a window area, the lower transverse edge of which is pulled down to the folding top clamping collar to such an extent, that this clamping collar, when the folding top is closed, acts as a supporting and closing part. In its upper region, the rear window is integrated into the skin of the roof by a three-sided enclosure in the form of a U-shaped frame and the latter is no longer provided between the lower transverse side edge of the rear window and the folding top clamping collar. With its lower transverse side edge, the rear window lies over a sealing system directly on the folding top clamping collar in a closed position in such a manner that the overlapping achieved therewith shows reliable tightness even if the contacting forces are small.

With this tying of the rear window into the roof skin, an advantageous enlargement of the cut-out in the roof skin, provided for the rear window, is achieved and the vision in the rear region of the vehicle is improved as a whole, so that the safety requirements are fulfilled even in the case of different roof contours and aerodynamically changed folding tops of different types of vehicles.

With regard to significant further details and advantageous developments of the invention, reference is made to the following description and the drawings in which several examples of convertible vehicles with the inventive rear window are explained in greater detail.

IN THE DRAWINGS

Figure 2:
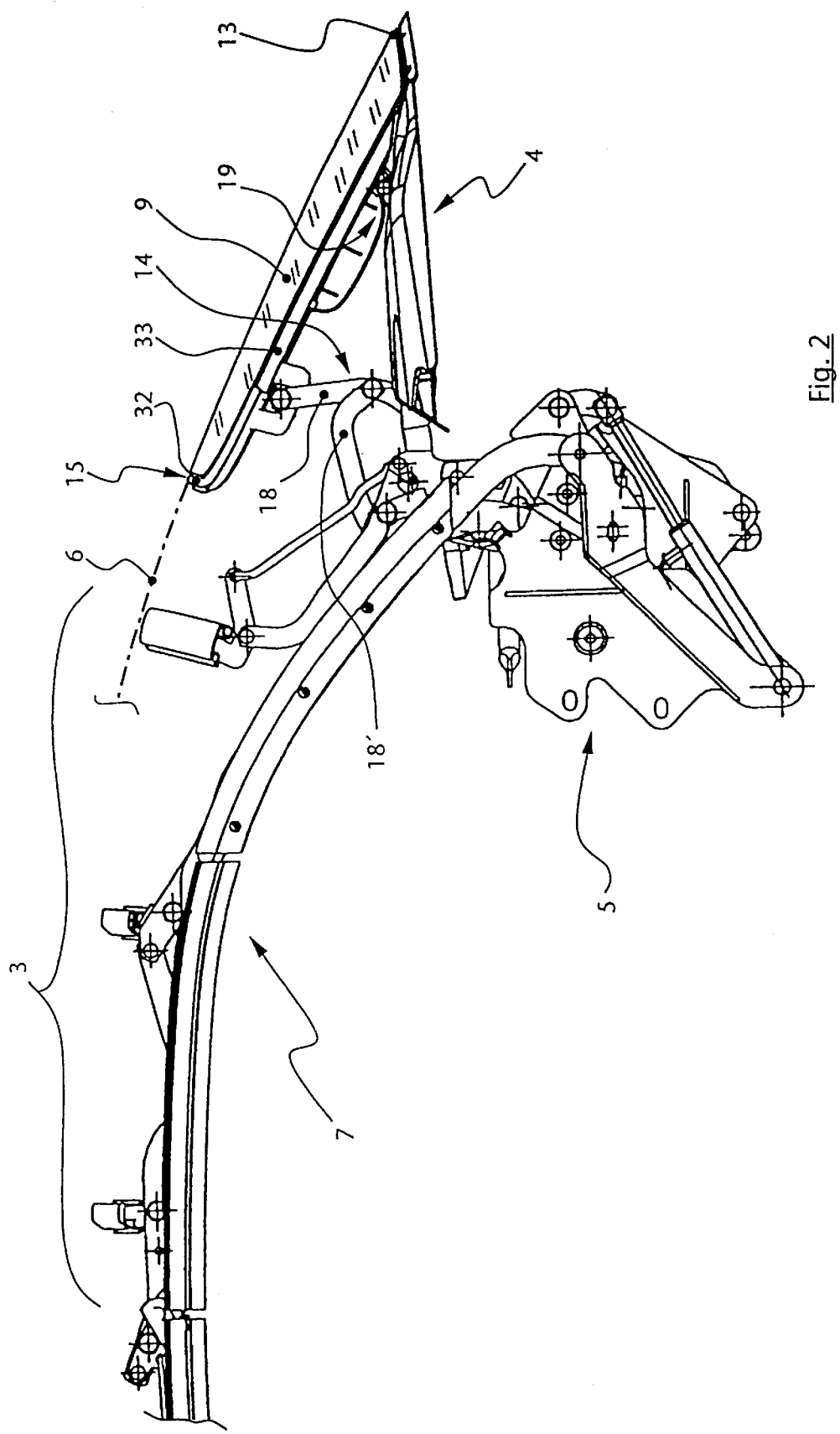
Figure 3:
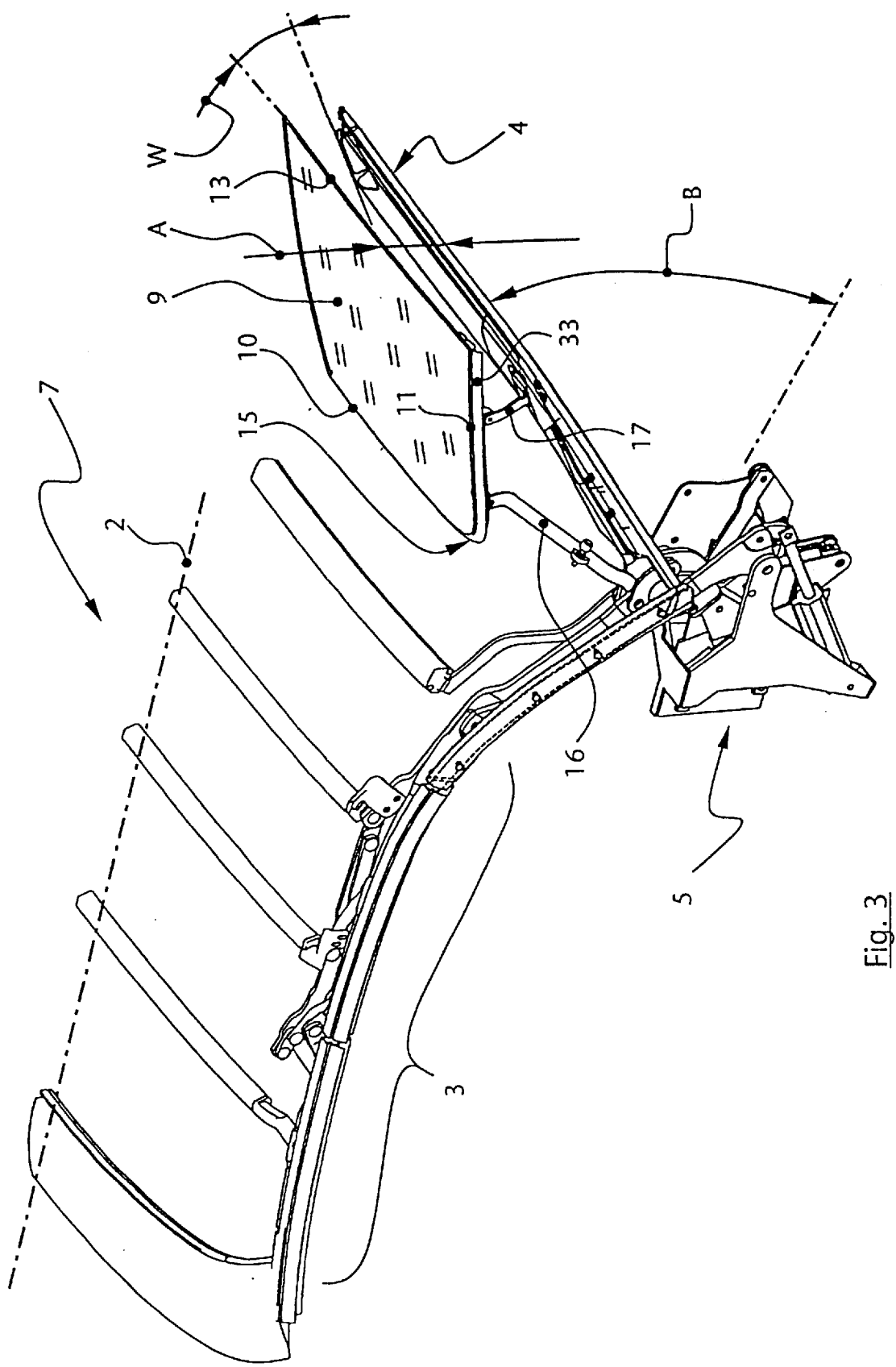
Figure 4:
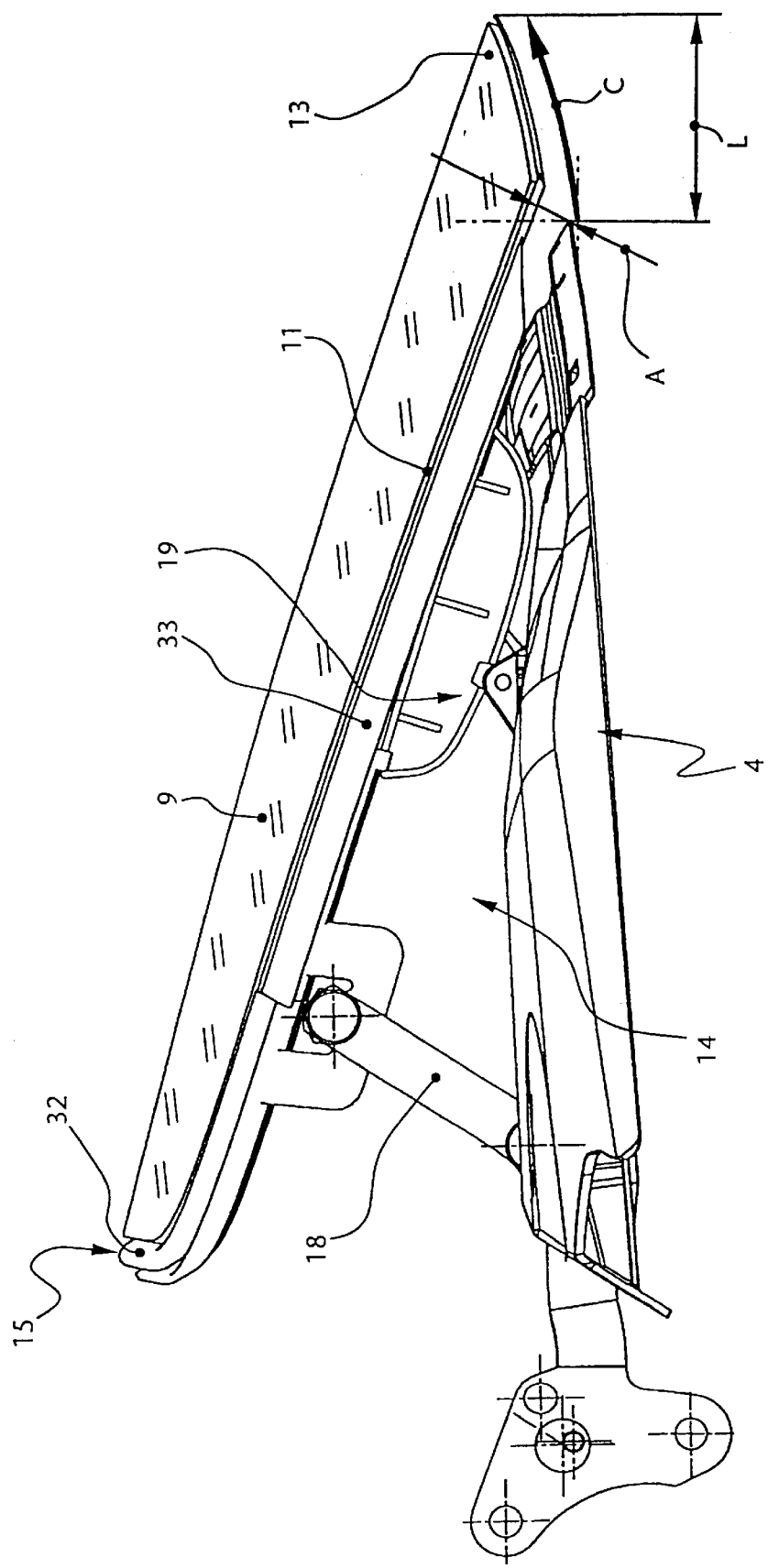
Figure 5:
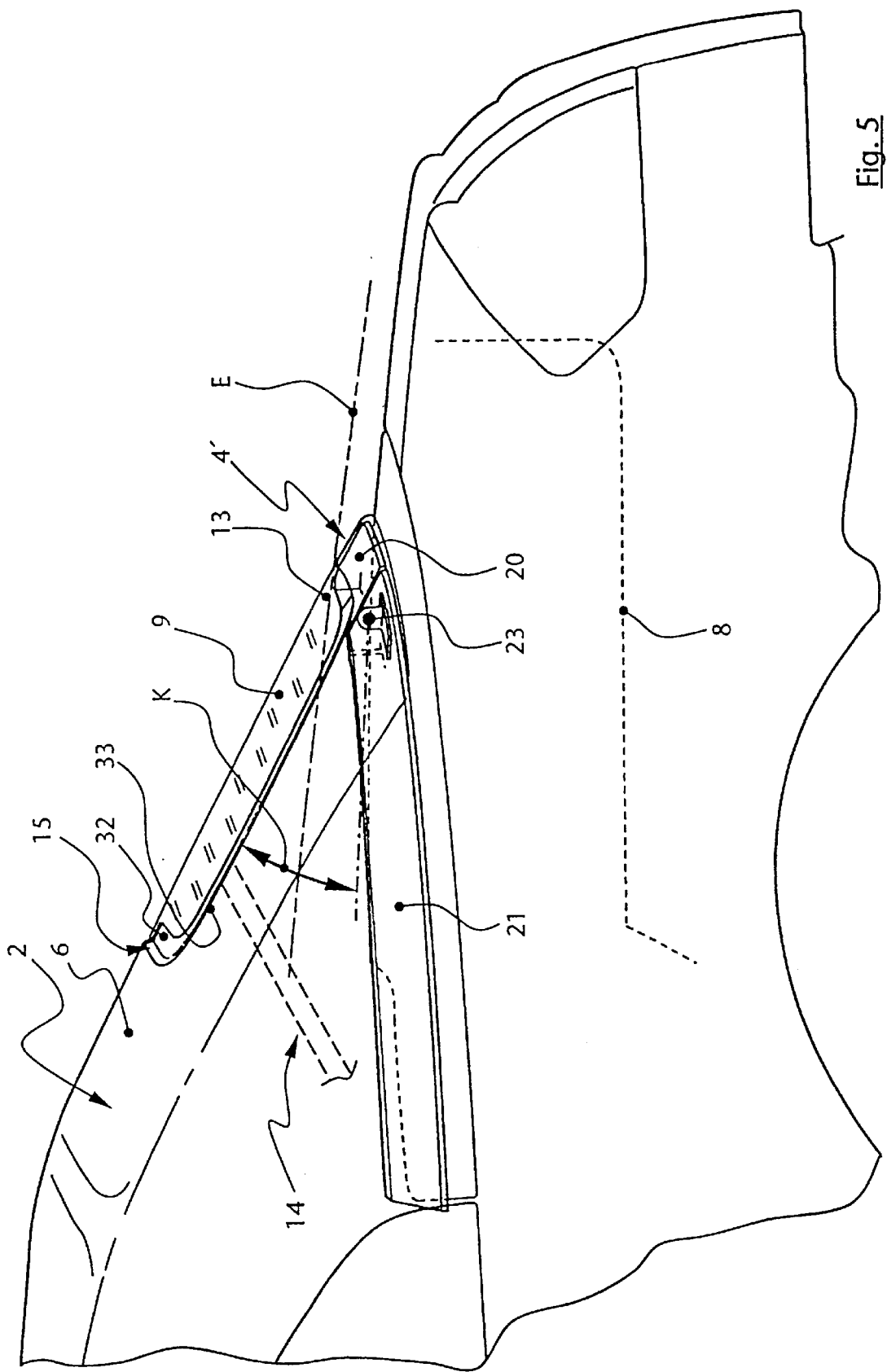
Figure 6:
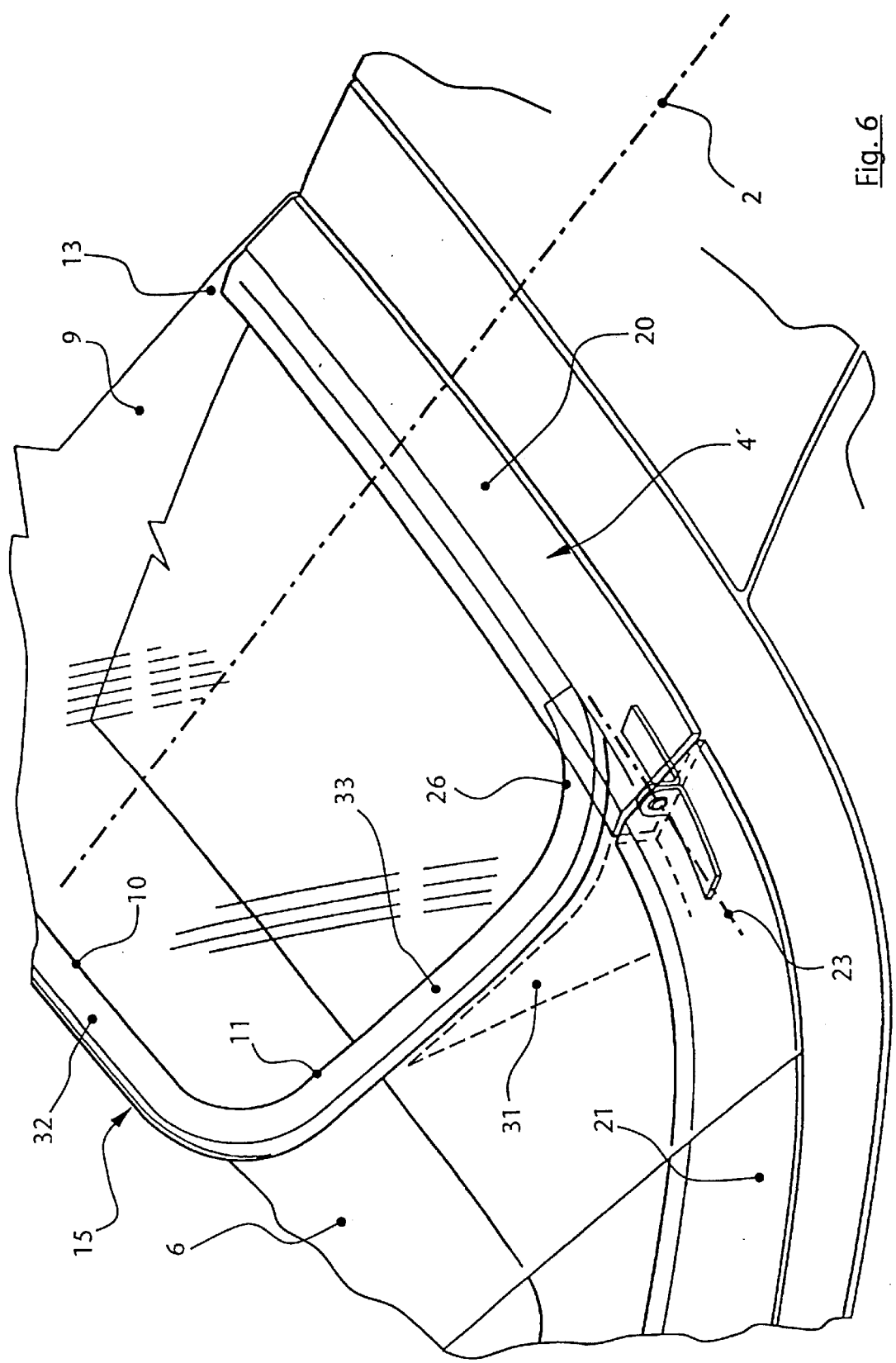

FIG. 1 shows a perspective rear view of a convertible vehicle with a folding top, having a rear window, in the closed position, FIG. 2 shows an enlarged side view of the folding top frame with a lateral control assembly in a first embodiment in the closed position of FIG. 1, FIG. 3 shows a perspective detailed representation of the folding top frame, similar to that of FIG. 2, with the rear window and the folding top clamping collar in an opening phase, FIG. 4 shows an enlarged detailed representation of the assembly group, formed by the rear window and the folding top clamping collar, with a second embodiment of a control assembly group, FIG. 5 shows an enlarged sectional representation of the rear region of the convertible vehicle with the rear window support at the folding top clamping collar in a multi-part embodiment, and FIG. 6 shows an enlarged perspective representation of the rear window connection with the multi-part folding top clamping collar of FIG. 5.

DESCRIPTION OF THE PREFERRED EMBODIMENTS

FIG. 1 shows a convertible vehicle, which is labeled 1 as a whole and has a folding top frame 3 (FIG. 2) with a rear folding top clamping collar 4, the folding top frame 3 being constructed in mirror image fashion to the longitudinal median plane 2 of the vehicle. When shifted about a main bearing 5, which is attached to the car body, the folding top 7, which has a flexible roof skin 6, together with the folding top frame 3 can be stowed in a folding top compartment 8 (FIG. 5) or returned from this into the closed position. In the rear region of its flexible roof skin 6, the folding top 7 is provided with a rear window 9 with an essentially rectangular circumferential contour, which extends above the folding top clamping collar 4 and is constructed especially as a solid glass window.

The convertible vehicle, which is constructed pursuant to the invention, has a rear window 9, which has a connection, which takes hold of the flexible roof skin only in the region of the upper transverse side edge 10 as well as of the two longitudinal side edges 11 and 12 of the rear window, which are parallel to the longitudinal median plane 2 of the vehicle. The rear window 9 is supported with its lower transverse side edge 13 directly on the folding top clamping collar 4. With that, vision through the rear region of the vehicle is improved in all of the embodiments of FIGS. 2 to 6 shown, owing to the fact that, with the direct support, components impeding vision are avoided and a vehicle user has a greater field of vision in a vision plane E (FIG. 5).

To handle this enlarged rear window 9, the latter has a control assembly 14, which engages the longitudinal side edges 11 and 12 (of which only one is shown), and is connected with the driving kinematics of the folding top frame 3, the main bearing 5 and the folding top clamping collar 4. Directly in the edge region in which the rear window 9 and the roof skin 6 are connected, this control assembly 14 may be hinged in such a manner, that it is subjected during the movement of the folding top to a constrained control due to the folding of the roof skin (not shown).

In the embodiment of the rear window connection of FIGS. 2 to 6 shown, the rear window 9 in each case has a frame 15, which embraces it with an upper transverse side leg 32 and parallel longitudinal side legs 33 and 34 and to which the control assembly 14 is hinged. With a connection of this design, the rear window 9 can be shifted under the control of the folding top kinematics. Likewise, it is conceivable that a driving organ, which is not shown, is integrated into the assembly for moving the rear window 9.

The lower transverse side edge 13 of the rear window 9 can be fixed over its whole width on the folding top clamping collar 4 in a detachable connecting engagement. The views of FIGS. 2 to 4 illustrate that the lower transverse side edge 13 of the rear window 9 lying in the closed position (FIG. 2) of the folding top 7 from above on the folding top clamping collar 4 so as to form a seal, can be shifted relative to the folding top clamping collar 4 and, during the movement of the latter, a distance A is formed at least phase-wise between the transverse side edge 13 and the folding top clamping collar 4. With the embodiment of the control assembly 14 shown in FIGS. 2 and 4, the rear window 9, starting from its closed position, in which it lies on the folding top clamping collar 4, is shifted towards the outside (arrow L, FIG. 4).

In FIG. 3, the control assembly 14 is provided with a parallelogram link arrangement having two hinged struts 16 and 17, so that the rear window 9, during a first opening phase (arrow B) of the folding to top 7, is swiveled up together with the folding top clamping collar 4, these two parts forming the distance A with an expansion position (angle W). The hinged struts 16 and 17 are hinged, on the one hand, to the longitudinal side leg 33 (and 34, not visible) of the frame 15 and, on the other, a connection is produced with the folding top frame 3 and with the folding top clamping collar 4.

In the embodiment of FIGS. 2 and 4, the control assembly 14, in the vicinity of the folding top frame 3, has a swiveling leg 18, which is provided between the longitudinal side leg 33 of the frame 15 and the folding top clamping collar 4 and interacts over a guiding assembly 19 (instead of the swiveling strut 17, FIG. 3) with the rear window 9 and the folding top clamping collar 4. With this driving concept, a swiveling and lifting movement, illustrated by arrow C, is imparted to the rear window. The swiveling leg 18 is connected over a guiding strut 18' with the folding top frame 3 (FIG. 2).

In FIGS. 5 and 6, the construction, connecting the rear window 9 to the frame 15, is provided with a folding top clamping collar 4', which is constructed in three parts in its longitudinal direction and has two side parts 21 and 22 (not visible), which extend parallel to its middle part 20. In this embodiment, the lower transverse side edge 13 of the rear window 9 is supported on the middle part 20, which extends between the side parts 21 and 22.

The two side parts 21, 22 are connected with the middle part 20 by a supporting axis 23, which extends essentially perpendicularly to the longitudinal median plane 2 of the vehicle and, in the rear window 9 in the region of its lower transverse side edge 13, is firmly connected with the middle part 20 in any manner, the details of which are not shown. In an appropriate embodiment, this firm connection between the rear window 9 and the folding top clamping collar 4' is achieved owing to the fact that the U-shaped frame 15, in region of its side legs 33 (and 34), is connected terminally in the region of an arched contour 26 with the middle part 20 and the transverse side edge 13 is gripped from below by a seal (not shown).

This type of connecting the rear window 8 to the folding top clamping collar 4' of FIG. 6 also results in improved vision in the plane E. The rear window 9 can be swiveled jointly with the middle part 20 (arrow K, FIG. 5), so that, when this assembly is stowed in the folding top compartment 8, the rear window 9 can be swung down as far as the plane of the folding top clamping collar 4' and a space-saving, tight, packed position of this folding top 7 is achieved.

In the embodiments of the folding top frame 3, shown in FIGS. 2 to 6, the individual parts of the roof skin 6, for greater clarity, have been shown in each case by a line of dots and dashes. For an optimum movement and folding of this roof skin 6, it has turned out to be advisable that, in the region connecting the rear window 9 or externally in the region of the respective longitudinal side legs 33 (and 34) of the frame 15, a pocket 31 for the fabric of the folding top (broken line in FIG. 6) be provided, which extends in the roof skin 6 to the respective folding top clamping collar 4, 4' or to the side parts 21, 22 of the latter and acts as a tension compensating zone during the movement of the folding top 7.

What is claimed is:

1. A convertible vehicle, comprising:
   a folding top including a folding top frame having a rear folding top clamping collar, a roof skin retained by said folding top frame, and a rear window arranged in said folding top frame above said folding top clamping collar, said rear window having an upper edge, a lower edge and side edges, said rear window being connected to said roof skin only along said upper edge and said side edges, said folding top having an open position in which said folding top is adapted to be stored in a storage compartment in the vehicle and a closed position, said lower edge of said rear window being supportable directly over said folding top clamping collar when said folding top is in the closed position; and
   a main bearing, said folding top being movable relative to said main bearing into and out of the storage compartment.

2. The convertible vehicle of claim 1, wherein said rear window is separable from said folding top clamping collar in a region of said lower edge of said rear window.

3. The convertible vehicle of claim 2, wherein said lower edge of said rear window is rotatable outward upon separation of said rear window apart from said folding top clamping collar.

4. The convertible vehicle of claim 1, wherein said folding top frame is constructed in mirror image fashion to a longitudinal median plane of the vehicle.

5. The convertible vehicle of claim 1, wherein said rear window has a substantially rectangular shape.

6. The convertible vehicle of claim 1, further comprising a control assembly arranged in connection with each side of said rear window and connected to at least one of said folding top frame and-said folding top clamping collar for enabling movement of said rear window relative to said folding top.

7. The convertible vehicle of claim 6, further comprising a window frame for supporting said rear window, said window frame engaging said control assembly.

8. The convertible vehicle of claim 7, wherein said window frame is substantially U-shaped and is positioned along said upper edge and said side edges of said rear window.

9. The convertible vehicle of claim 1, wherein said lower edge of said rear window is situated against said folding top clamping collar when said folding top is in the closed position to thereby form a seal between said rear window and said folding top frame.

10. The convertible vehicle of claim 1, wherein said rear window is arranged such that said lower edge of said rear window is movable relative to said folding top clamping collar when said folding top is in the closed position to provide a distance between said lower edge of said rear window and said folding top clamping collar.

11. The convertible vehicle of claim 1, wherein said rear window is arranged to swivel relative to said folding top clamping collar to an expansion position during movement of said folding top.

12. The convertible vehicle of claim 1, further comprising a window frame for supporting said rear window, said window frame being arranged to support said rear window in a region of said side edges and said upper edge of said rear window.

13. The convertible vehicle of claim 12, wherein said window frame is U-shaped and includes an upper part along said upper edge of said rear window and two side parts, each along a respective one of said side edges of said rear window, said upper part and said two side parts of said window frame being connected to said roof skin.

14. The convertible vehicle of claim 12, further comprising a control assembly arranged in connection with each side of said rear window for enabling movement of said rear window relative to said folding top, said window frame comprising two side parts each situated along a respective one of said side edges of said rear window, said control assembly being hinged to a respective one of said two side parts of said window frame.

15. The convertible vehicle of claim 14, wherein said control assembly comprises a swivel leg pivotally connected at one end to the respective one of said two side parts of said window frame and pivotally connected at an opposite end to said folding top clamping collar.

16. The convertible vehicle of claim 15, wherein said control assembly further comprises a guiding strut connected at one end to said swivel leg and at an opposite end to said folding top frame.

17. The convertible vehicle of claim 15, wherein said control assembly further comprises a guide assembly for connecting said window frame to said folding top clamping collar.

18. The convertible vehicle of claim 1, further comprising a control assembly arranged in connection with each side of said rear window for enabling movement of said rear window relative to said folding top, said control assembly comprising two hinged struts each pivotally connected at one end to said rear window and at an opposite end to said folding top clamping collar to thereby define a parallelogram linkage.

19. The convertible vehicle of claim 18, further comprising a window frame for supporting said rear widow, said window frame comprising two side parts each supporting a respective one of said side edges of said rear window, said two hinged struts of said control assembly being hinged to a respective one of said two side parts.

20. The convertible vehicle of claim 1, wherein said rear window includes a pocket of material on an outside in a region of a respective one of said side edges, said pocket of material extending to said folding top clamping collar and constituting a tension compensating zone.

21. The convertible vehicle of claim 1, wherein said folding top clamping collar comprises a middle part arranged underneath said lower edge of said rear window and a side part arranged on each side of said middle part.

22. The convertible vehicle of claim 21, further comprising a swivel joint arranged between said middle part and each of said side parts.

23. The convertible vehicle of claim 21, wherein said rear window is connected to said middle part of said folding top clamping collar.

24. The convertible vehicle of claim 21, further comprising a window frame for supporting said rear window, said window frame comprising two side parts each situated along a respective one of said side edges of said rear window, said side parts being connected to said middle part of said folding top clamping collar.

25. The convertible vehicle of claim 21, further comprising a control assembly arranged in connection with each of said side parts of said window frame and connected to at least one of said folding top frame and said folding top clamping collar for enabling movement of said rear window relative to said folding top, said middle part of said folding top clamping collar being arranged to rotate relative to said side parts of said folding top clamping collar about a supporting axis, said rear window being attached to said middle part such that said control assembly is arranged to rotate said rear window about said supporting axis.

* * * * *